…

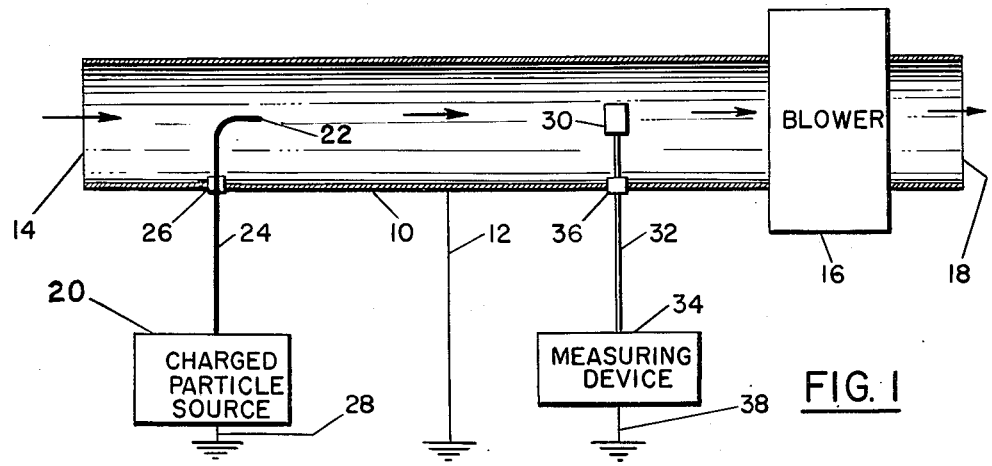
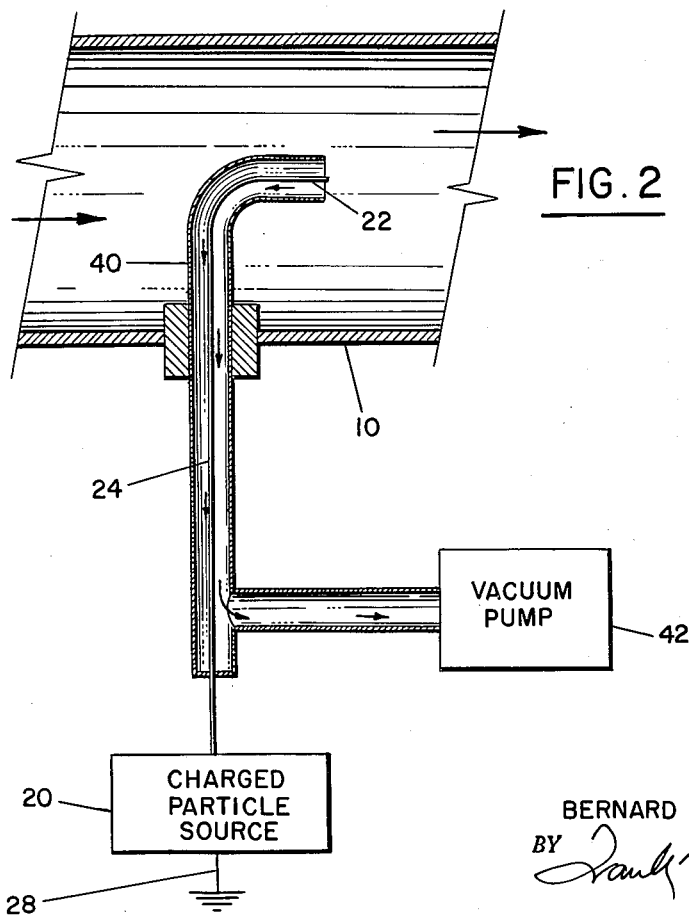

United States Patent Office 2,986,923
Patented June 6, 1961

2,986,923
MEANS FOR DETECTING AND MEASURING AEROSOLS
Bernard Vonnegut, North Scituate, Mass., assignor to Arthur D. Little, Inc., Cambridge, Mass., a corporation of Massachusetts
Filed June 18, 1954, Ser. No. 437,812
5 Claims. (Cl. 73—28)

This invention relates to means for detecting and measuring electrostatically the presence and amounts of smokes and other aerosols in the atmosphere or in other gaseous fluids. In accordance with this invention, I provide a very simple apparatus and procedure for measuring, with a relatively high degree of accuracy, amounts of fine particles, of sizes ranging from around 1 micron in radius to as little as about 0.01 micron. As far as I am aware, it has not been possible hitherto to measure with any degree of accuracy at all the amounts of such finer particles—e.g. of 0.1 to 0.01 micron radius—present in the atmosphere or other gaseous fluid.

Briefly stated, the apparatus of this invention comprises an elongated chamber having electrically conducting walls, means for forcing through the chamber a current of air or other gas to be examined, a source of electrons or other charged particles within the chamber, the charged particles from said source all having the same electric sign, and a measuring device, positioned within the chamber downstream from said charged-particle source, adapted to measure the electric field resulting from charging the aerosols in the gas by said charged-particle source.

A more complete understanding of this invention may be had by reference to the accompanying drawings, wherein:

FIG. 1 represents a schematic view, generally in cross-section, of a typical device of this invention; and
FIG. 2 represents a modification thereof.

In the drawings, the numeral 10 represents an elongated chamber which is conveniently but not necessarily cylindrical, and which has electrically conducting walls which are grounded through lead 12. One end 14 of the chamber is open to the atmosphere or other gas to be examined, and the other end is provided with a blower 16 which draws the air or gas through the chamber, expelling it at opening 18. Toward end 14 is positioned means for introducing charged particles into the stream of air or gas, which means are represented by a suitable source 20, described in more detail below, a point of introduction 22 for the charged particles, located in the center of the chamber, conducting means 24 between said source 20 and said point 22, means 26 for insulating the conducting means from the walls of chamber 10, and a lead 28 for grounding the source 20. Located downstream in the chamber 10 from the source of charged particles is a device for measuring the electric field caused by charging the aerosols in the air or gas stream by source 20. This device as shown in FIG. 1 comprises a radioactive electrode 30 which is mounted centrally in the chamber, and which is attached by lead 32 to an electrometer or other measuring device 34 for measuring the field around electrode 30. Lead 32 is insulated from the walls of chamber 10 by insulating means 36, and measuring device 34 is grounded by lead 38.

As a more specific illustration, I may provide by source 20 a constant D.C. potential of 1000 volts or more, a corona-producing point or electrode 22, made preferably of a metal such as tungsten or platinum which is only slowly attacked by the corona, an electrical lead 24 therebetween, a radioactive electrode 30, and an electrometer 34.

In the operation of this device, the gas to be examined (air will be used as an example, but not by way of limitation) is drawn through chamber 10 at a constant rate by blower 16, in the direction indicated by the arrows. The air passes first over electrode 22, which is mounted in the center of the chamber 10 and is maintained at a constant D.C. potential of several thousand volts so that it constantly produces a corona discharge of fast ions which very rapidly move to the walls of the chamber. All aerosol particles in the air being drawn through the apparatus become charged, with charges of the same sign, by the stream of fast ions produced by the electrode 22. Because the fast ions from the electrode have a very high mobility, those fast ions that do not become attached to aerosol particles in the air move to the chamber wall very rapidly and leave the air stream. Because they have a much lower mobility, the charged aerosol particles do not move toward the walls very rapidly and the charged aerosol particles are carried down the chamber along with the air. The aerosol particles all carry charge of the same sign and therefore constitute a space charge within the metal chamber. Because of the space charge there will be an electric field within the chamber that is proportional to the space charge. This field is readily determined by means of the radioactive electrode 30. The ionization of the air produced by the radioactivity allows the electrode to assume the potential of the point in space that it occupies. This potential as indicated by the electrometer 34 is a measure of the space charge within the chamber 10 which in turn is a measure of the amount of aerosol present in the air.

A number of modifications are possible in the above-described apparatus. For example, instead of providing a corona discharge, the point or electrode 22 may be a heated filament, or a radioactive source such as radium or polonium in a suitable carrier. When a radioactive source is so used, the D.C. potential provided by source 20 may be far lower, e.g. in the order of 100 volts instead of 1000 volts or more for the corona discharge. Instead of using a radioactive probe at 30, other known measuring means may be employed, such as a rotating or vibrating generating voltmeter, a water dropper, a small flame, or a heated filament. Such measuring means are fully described in Chalmers, Atmospheric Electricity, Oxford University Press, 1949, pages 50 through 65.

For very small aerosol particles such as Aitken nuclei, which have a radius of the order of .01 micron, the maximum electrical charge that can be carried per particle is one elementary charge. In the case of the particles of this size, the space charge is therefore a direct measure of particle concentration. Particles of a larger size can become multiply charged according to Ladenburg's equation $$Q = E_0 r^2 1 + 2\left[\frac{K-1}{K+1}\right]$$

where $Q$ is the charge per particle, $r$ is the radius of the particle, $K$ is the dielectric constant, and $E_0$ is the charging field intensity. By determining the variation of the space charge as the charging field is varied, it is therefore possible to obtain a measure of the particle size distribution.

A measure of the particle size distribution can also be obtained by passing the particles, after they have been charged, through an electric field that will cause them to move towards the walls. The mobility of the larger particles, and therefore the rate at which they precipitate out, will vary directly as their radius. Therefore, the particle size can be determined by measuring how the space charge varies with the field used for precipitation.

When corona from a point, or a hot filament, is used at 22 to charge aerosol particles in the air entering the chamber 10, it is possible that errors can be introduced because of aerosol particles produced by disintegration of the point or by the hot wire. In general, these errors are negligible; however, in order to keep them at a mimimum, it is desirable that the rate of air flow through the apparatus be kept sufficiently high that the concentration of these spurious particles be maintained at a level that is low compared to the concentration of particles in the air. This source of possible error can be removed by using the arrangement shown in FIG. 2, wherein like numbers refer to like parts as shown in FIG. 1. An insulated tube 40 is placed around the corona point 22 and a fraction of the air passing through the chamber 10 is drawn off through this tube 40 by vacuum pump 42 at such a speed that the air velocity at the point 22 is large compared to the mobility of the spurious charged aerosol particles produced by the point. By this technique, the spurious particles will be removed from the apparatus while the fast ions that charge the aerosol, because of their high mobility, will be unaffected by the air stream.

It is worth pointing out that the sensitivity of this type of apparatus can be easily varied to give a very wide range by altering the size of the chamber 10 where the charged air passes the measuring electrode 30. The potential difference between the center of the chamber 10 and the walls varies directly as the square of the radius of the chamber, permitting a very wide range of sensitivity.

I claim:

1. Apparatus for detecting and measuring aerosols in a gaseous fluid, which comprises an elongated chamber having electrically conducting grounded walls, means for moving a stream of said gaseous fluid longitudinally through said chamber, an element positioned in said stream and adapted to introduce into said stream charged particles of one sign only, said element comprising a radioactive electrode mounted centrally in said chamber, means for supplying a constant D.C. potential to said electrode sufficient to produce charged particles thereat, means positioned adjacent said radioactive electrode for drawing off a fraction of said stream of gaseous fluid passing said electrode at a rate sufficient to draw off from said stream the spurious aerosol particles produced by the disintegration of said electrode, and measuring means downstream from said electrode and at the axial center of said chamber for measuring the electric field resulting from the charging of said aerosols by said charged particles said measuring means communicating electrically with an electrometer positioned outside said chamber, said electrometer and said potential-providing means also being grounded.

2. Apparatus for detecting and measuring aerosols in a gaseous fluid, which comprises an elongated chamber having electrically conducting walls, means for moving said gaseous fluid in a stream longitudinally through said chamber, a corona-producing element positioned in said stream, means for providing a constant D.C. potential at said element in an amount sufficient to provide corona discharge at said element, and measuring means positioned downstream from said element and at the axial center of said chamber and in said stream for measuring the electric field resulting from the charging of said aerosols by said corona discharge, said measuring means comprising a radioactive electrode communicating electrically with an electrometer positioned outside said chamber; said chamber, said potential-providing means and said electrometer being grounded.

3. Apparatus in accordance with claim 2, comprising means positioned adjacent said corona-producing element for drawing off a fraction of said stream of gaseous fluid passing said element at a rate sufficient to draw off from said stream the spurious aerosol particles produced by the disintegration of said element.

4. Apparatus for detecting and measuring aerosols in a gaseous fluid, which comprises an elongated chamber having electrically conducting grounded walls, means for moving a stream of said gaseous fluid longitudinally through said chamber, a corona-producing element positioned in said stream and adapted to introduce into said stream charged particles all of one sign, means for supplying a constant D.C. potential to said element sufficient to produce corona discharge at said element, and measuring means downstream from said element and at the axial center of said chamber for measuring the electric field resulting from the charging of said aerosols by said corona discharge, said measuring means comprising an electrode communicating electrically with an electrometer positioned outside said chamber; said potential-providing means and said electrometer also being grounded.

5. Apparatus according to claim 4 wherein said measuring means comprises a radioactive electrode.

References Cited in the file of this patent

UNITED STATES PATENTS

| | | |
|---|---|---|
| 1,070,556 | Strong | Aug. 19, 1913 |
| 1,071,532 | Strong | Aug. 28, 1913 |
| 1,411,796 | Meyer | Apr. 4, 1922 |
| 1,421,720 | Roberts | July 4, 1922 |
| 1,808,709 | Blake | June 2, 1931 |
| 2,307,602 | Penney et al. | Jan. 5, 1943 |
| 2,408,051 | Donelian | Sept. 24, 1946 |
| 2,611,268 | Mellen | Sept. 23, 1952 |
| 2,627,543 | Obermaier | Feb. 3, 1953 |
| 2,637,208 | Mellen | May 5, 1953 |
| 2,709,229 | Linder | May 24, 1955 |
| 2,740,894 | Deisler | Apr. 3, 1956 |
| 2,785,312 | Martin | Mar. 12, 1957 |